US008156156B2

(12) United States Patent  
Ferragina et al.

(10) Patent No.: US 8,156,156 B2  
(45) Date of Patent: Apr. 10, 2012

(54) METHOD OF STRUCTURING AND COMPRESSING LABELED TREES OF ARBITRARY DEGREE AND SHAPE

(75) Inventors: Paolo Ferragina, Pisa (IT); Fabrizion Luccio, Pisa (IT); Giovanni Manzini, Pisa (IT); Shanmugavelayut Muthukrishnan, New York, NY (US)

(73) Assignee: Universita di Pisa, Pisa (IT)

( * ) Notice: Subject to any disclaimer, the term of this patent is extended or adjusted under 35 U.S.C. 154(b) by 602 days.

(21) Appl. No.: 11/783,288

(22) Filed: Apr. 6, 2007

(65) Prior Publication Data

US 2007/0255748 A1 Nov. 1, 2007

Related U.S. Application Data

(60) Provisional application No. 60/789,582, filed on Apr. 6, 2006.

(51) Int. Cl.
*G06F 7/00* (2006.01)
*G06F 17/30* (2006.01)
(52) U.S. Cl. ...................................... 707/803
(58) Field of Classification Search .............. 707/803, 707/999.101
See application file for complete search history.

(56) References Cited

U.S. PATENT DOCUMENTS

| 6,938,204 B1 * | 8/2005 | Hind et al. ............... 715/234 |
| 2006/0271573 A1 * | 11/2006 | LeTourneau ............. 707/100 |
| 2007/0083810 A1 * | 4/2007 | Scott et al. ............... 715/525 |

OTHER PUBLICATIONS

G. Jacobson, Space-efficient Static Trees and Graphs. Proc IEEE Symposium on Foundations of Computer Science (FOCS), pp. 549-554, 1989.
I. Munro et al., Succinct Representation of Balanced Parentheses, Static Trees and Planar Graphs. Proc. IEEE Symposium on Foundations of Computer Science (FOCS), pp. 118-126, 1997.
P. Ferragina et al., An alphabet-friendly FM-index. Proc. 11th Symposium on String Processing and Information Retrieval (SPIRE), pp. 150-160, Springer-Verlag, LNCS n. 3246, 2004.
R. Grossi et al., High-order entropy-compressed text indexes. Proc. ACM-SIAM Symposium on Discrete Algorithms (SODA), pp. 841-850, 2003.
J. Karkkainen et al., Simple Linear Work Suffix Array Construction. Proc. Of the International Colloquium on Automata, Languages and Programming (ICALP), Springer-Verlag, LNCS n. 2719, pp. 943-955, 2003.
Paolo Ferragina et al., Structuring labeled trees for optimal succinctness, and beyond, Proceedings of the 2005 $46^{th}$ Annual IEEE Symposium on Foundations of Computer Science (FOCS'05), pp. 1-10, 2005.
Paolo Ferragina et al., Compressing and Indexing Labeled Trees, with Applications, Journal of the ACM, vol. 57, No. 1, Article 4, Publication date: Nov. 2009.
P. Ferragina et al., Compressing and Searching XML Data Via Two Zips, Proceedings of the 15th international conference on World Wide Web (WWW), May 23-26, 2006, Edinburgh, Scotland.

* cited by examiner

*Primary Examiner* — Aleksandr Kerzhner  
(74) *Attorney, Agent, or Firm* — Dennison, Schultz & MacDonald

(57) ABSTRACT

A method of structuring and compressing labeled trees of arbitrary degree and shape for optimal succinctness, the method including a transform for compressing and indexing tree shaped data, using path sorting and grouping to linearize labeled tree shaped data into two coordinated arrays, one capturing the structure of the tree and the other capturing the labels of the tree. Additional navigational operations and basic searching may be performed on the transformed data.

25 Claims, 16 Drawing Sheets

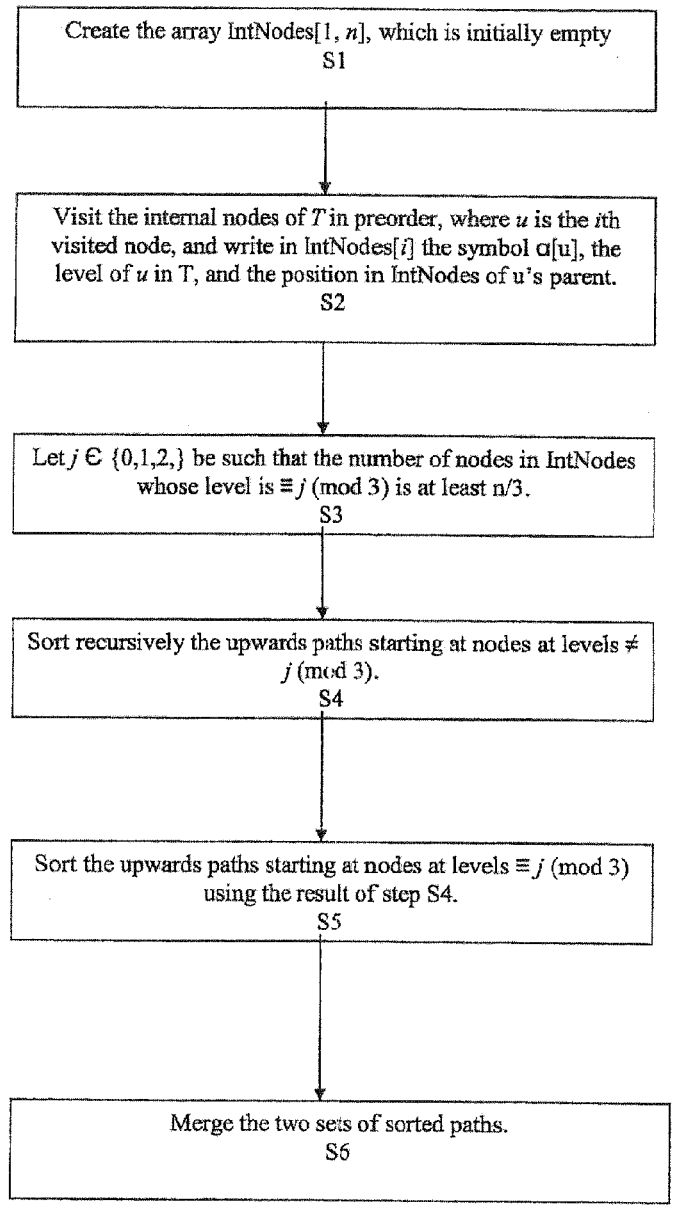

FIGURE 3

PathSort(*T*)

1. Create the array IntNodes[1, *n*] initially empty.

2. Visit the internal nodes of *T* in preorder. Let *u* denote the *i*th visited node. Write in IntNodes[*i*] the symbol α[*u*], the level of *u* in *T*, and the position in IntNodes of *u*'s parent.

3. Let *j* be an element of {0, 1, 2} be such that the number of nodes in IntNodes whose level is ≡ *j* (mod 3) is at least *n*/3. Sort recursively the upwards paths starting at nodes at levels ≠ *j* (mod 3).

4. Sort the upward paths starting at nodes at levels ≡ *j* mod 3 using the result of Step 3.

5. Merge the two sets of sorted paths.

FIGURE 4
BuildF(xbw(T))
1. for i=1, ..., t do C[Sα[i]] +=1;
2. F[1] = 2; { Sπ[1] is the empty string}
3. for i=1, ..., |ΣN|-1 do
4. j=F[i];
5. s=0;
6. while (s≠C[i]) do
7. if (Slast[j++] ==1)
8. s++;
9. F[i+1] = j;
10. return F.

FIGURE 5

```
BuildJ(xbw(T))

1.  F=BuildF(xbw(T))

2. for i=1, ..., t do 3. if (Sα[i] is an element of ΣL)

4.  J[i] = -1;         { Sα[i] is a leaf}

5. Else 6.  z = J[i] = F[Sα[i]];        { Sα[i] is an internal node}

7. while (Slast[z] ≠ 1) do    {reach the last child of Sα[i]}

8.  z = z + 1;

9.  F(Sα[i]) = z + 1

10.  return J
```

FIGURE 6
**GetChildren(*i*)**
1. if (*Sα*[*i*] is an element of $\Sigma L$) then return −1;
2. *c* = *Sα*[*i*];
3. *y* = select1(*A, c*); { *y is* F[*c*] }
4. *k* = rankc(*Sα, i*);
5. *z* = rank1(*Slast, y* − 1);
6. First = select1(*Slast, z+k−* 1)+1;
7. Last = select1(*Slast, z + k*);
8. return (First, Last).

FIGURE 7

**GetParent(*i*)**

1. if (*i* == 1) then return −1;

2. *c* = rank1(*A*, *i*);

3. *y* = select1(*A*, *c*);

4. *k* = rank1(Slast, *i*−1)−rank1(Slast, *y*−1);

5. *p* = selectc(S$\alpha$, *k* + 1);

6. return *p*.

FIGURE 8

SubPathSearch($q1q2 \ldots qk$)

1. $i = k$;

2. First = $F(qk)$; Last = $F(qk + 1) - 1$;

3. while (First ≤ Last) and ($i \geq 2$) do

$i = i - 1$;

$z = rank1(Slast, F(qi) - 1)$;
    { $z$ is # of nodes with label smaller than $qi$ }

6. $k1 = rankqi(S\alpha, First - 1)$;
    {# occurrences of $qi$ in $S\alpha[1, First - 1]$ }

7. First = $select1(Slast, z+k1- 1)+1$;
    {starting position of the ($z + k1$)-th group of siblings }

8. $k2 = rankqi(S\alpha, Last)$;
    { # of occurrences of $qi$ in $S\alpha[1, Last]$ }

9. Last = $select1(Slast, z + k2)$;
    {ending position of the ($z + k2$)-th group of siblings}

10. if (First > Last) then

11. return "no path prefixed by $q1q2 \ldots qk$";

12. else return (First, Last).

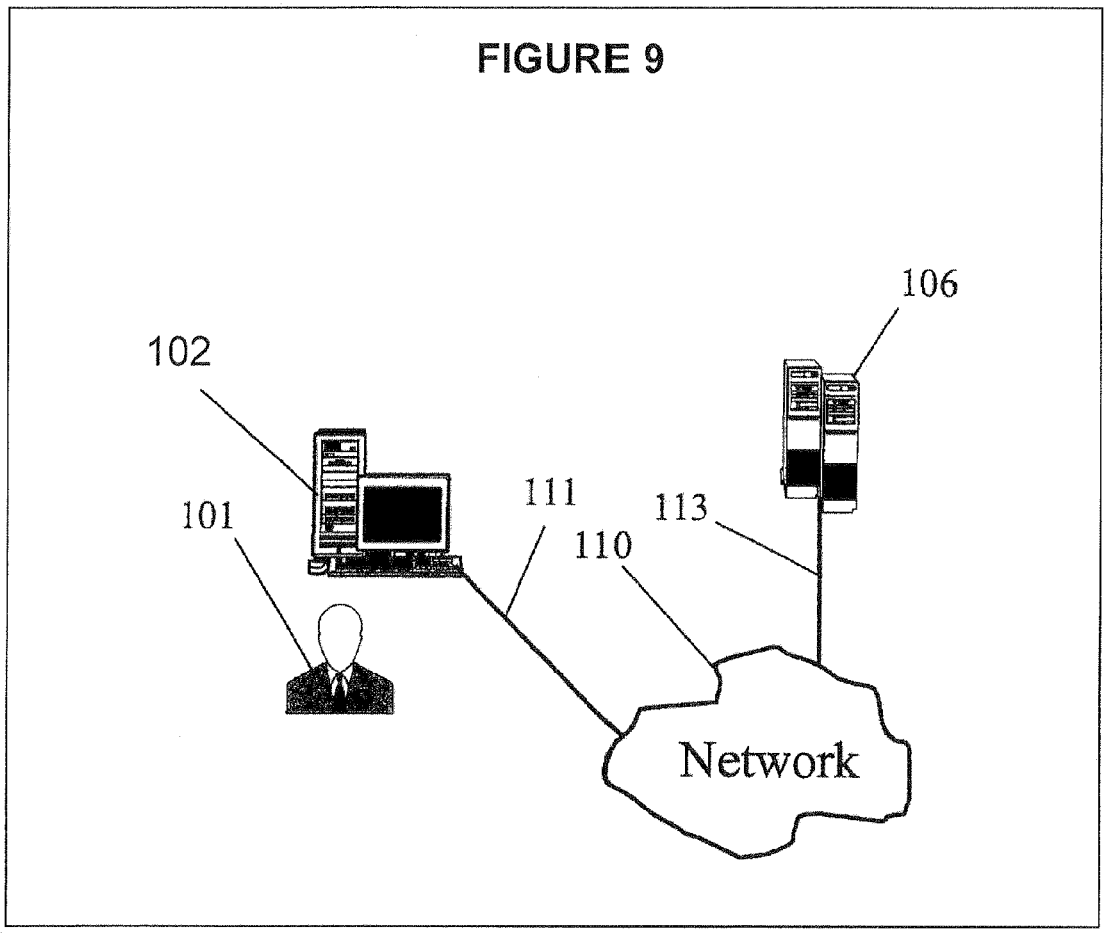

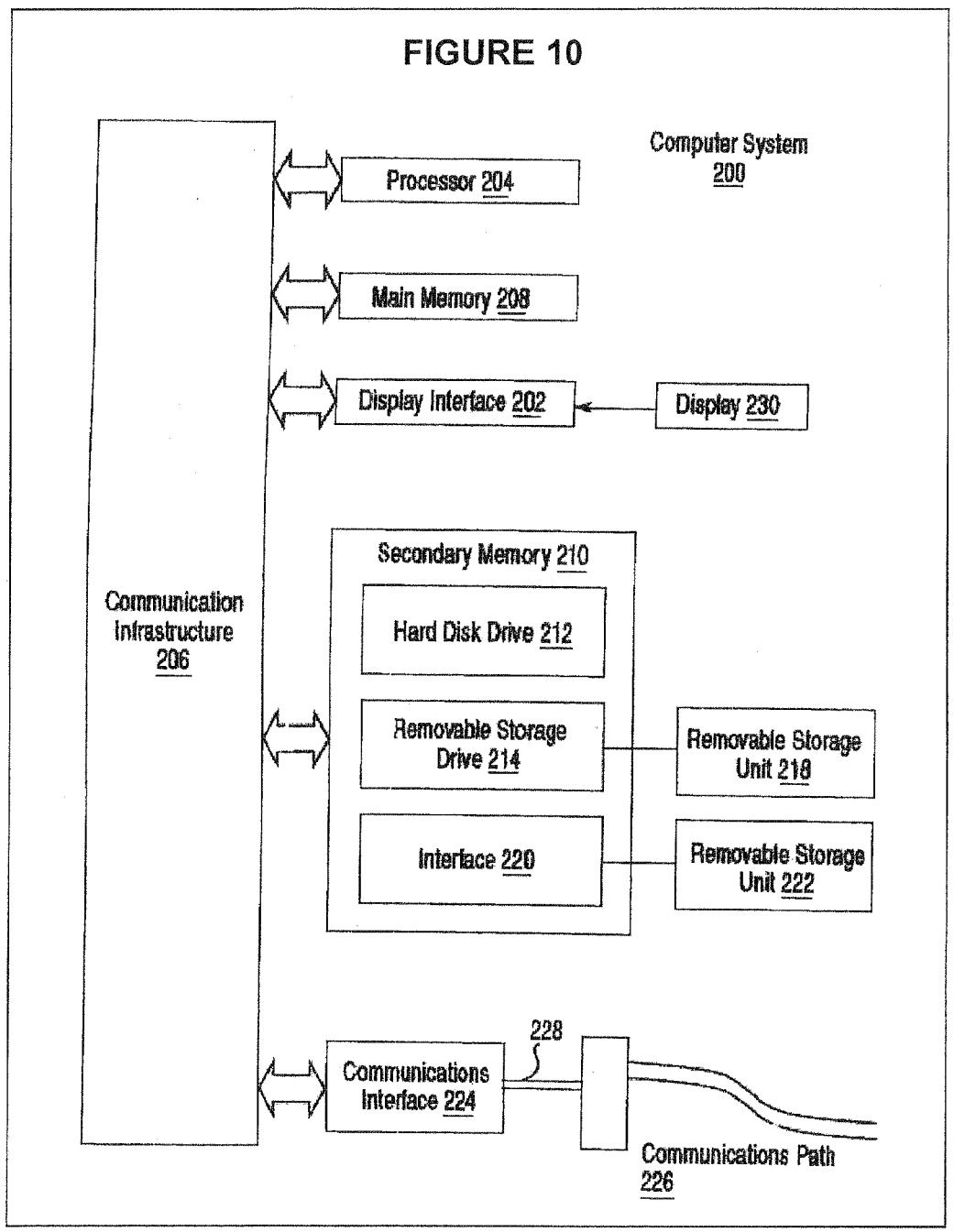

FIGURE 12

| $S_{last}$ | $S_\alpha$ | $S_\pi$ |
|---|---|---|
| 1 | <biblio | empty string |
| 0 | <book | <biblio |
| 0 | @id | <book<biblio |
| 1 | = | @id<book<biblio |
| 1 | 01 | =@id<book<biblio |
| 0 | <author | <book<biblio |
| 1 | = | <author<book<biblio |
| 1 | 0J. Austin | =<author<book<biblio |
| 1 | <title | <book<biblio |
| 1 | = | <title<book<biblio |
| 1 | 0Emma | =<title<book<biblio |
| 1 | <book | <biblio |
| 0 | @id | <book<biblio |
| 1 | = | @id<book<biblio |
| 1 | 02 | =@id<book<biblio |
| 0 | <author | <book<biblio |
| 1 | = | <author<book<biblio |
| 1 | 0C. Bronte | =<author<book<biblio |
| 1 | <title | <book<biblio |
| 1 | = | <title<book<biblio |
| 1 | 0Jane Eyre | =<title<book<biblio |

Stable sort →

| Rk | $S_{last}$ | $S_\alpha$ | $S_\pi$ |
|---|---|---|---|
| 1 | 1 | <biblio | empty string |
| 2 | 1 | = | <author<book<biblio |
| 3 | 1 | = | <author<book<biblio |
| 4 | 0 | <book | <biblio |
| 5 | 1 | <book | <biblio |
| 6 | 0 | @id | <book<biblio |
| 7 | 0 | <author | <book<biblio |
| 8 | 1 | <title | <book<biblio |
| 9 | 0 | @id | <book<biblio |
| 10 | 0 | <author | <book<biblio |
| 11 | 1 | <title | <book<biblio |
| 12 | 1 | = | <title<book<biblio |
| 13 | 1 | = | <title<book<biblio |
| 14 | 1 | = | @id<book<biblio |
| 15 | 1 | = | @id<book<biblio |
| 16 | 1 | 0J. Austin | =<author<book<biblio |
| 17 | 1 | 0C. Bronte | =<author<book<biblio |
| 18 | 1 | 0Emma | =<title<book<biblio |
| 19 | 1 | 0Jane Eyre | =<title<book<biblio |
| 20 | 1 | 01 | =@id<book<biblio |
| 21 | 1 | 02 | =@id<book<biblio |

$\widehat{S}_{last}$ = 110010010011111

$\widehat{S}_\alpha$ = <biblio==<book<book@id<author<title@id<author<title====

$\widehat{S}_{pcdata}$ = 0J. Austin0C. Bronte0Emma0Jane Eyre0102

FIGURE 13

GetChildren' (i)

1. $c = \hat{S}\alpha[i];$
2. $k = \text{rankc}(\hat{S}\alpha, i);$
3. $y = F[c];$
4. $z = \text{rank1}(\hat{S}\text{last}, y - 1);$
5. $\text{First} = \text{select1}(\hat{S}\text{last}, z+k-1)+1;$
6. $\text{Last} = \text{select1}(\hat{S}\text{last}, z + k);$
7. return (First, Last).

FIGURE 14

<u>XBzip</u>

1. Compute XBW(d) = <$\hat{S}$last, $\hat{S}\alpha$, $\hat{S}$pcdata>;

2. Merge $\hat{S}\alpha$ and $\hat{S}$last into $\hat{S}'\alpha$

3. Compress separately $\hat{S}'\alpha$ and $\hat{S}$pcdata using any kth order string compressor (e.g. Ppmdi).

FIGURE 15

XBzipIndex

1. Compute XBW(d) = <Ŝlast, Ŝα, Ŝpcdata>;

2. Store Ŝlast using a compressed representation supporting rank/select queries;

3. Store Ŝα using a compressed representation supporting rank/select queries;

4. Split Ŝpcdata into buckets such that two elements are in the same bucket if they have the same upward path;

5. Compress and index each bucket using any compressed full-text index (e.g. FM-index).

Algorithm ContentSearch(π, y)

1. (First, Last) ← SubPathSearch(π);

2. F ← rank=( $\hat{S}\alpha$, First − 1) + 1;

3. L ← rank=( $\hat{S}\alpha$, Last);

4. Let B[i, j] be the range of buckets covering $\hat{S}$pcdata[F, L].

5. Search for y in the compressed full-text indexes (e.g. FM-indexes)

METHOD OF STRUCTURING AND COMPRESSING LABELED TREES OF ARBITRARY DEGREE AND SHAPE

This application is based upon and claims the benefit of priority from the prior U.S. Provisional Application No. 60/789,582 filed on Apr. 6, 2006, the entire contents of which are incorporated herein by reference.

BACKGROUND OF THE INVENTION

1. Field of the Invention

The present invention is directed generally to a method of structuring and compressing labeled trees of arbitrary degree and shape for optimal succinctness, the method includes a transform for compressing and indexing tree shaped data. More specifically, the present invention includes a transform that uses path sorting and grouping to linearize labeled tree shaped data into two coordinated arrays, one capturing the structure of the tree and the other capturing the labels of the tree. The present invention also may include performing navigational operations on the labeled tree shaped data after the data has been transformed and possibly compressed.

2. Background of the Technology

Labeled trees are used for representing data or computation in computer applications including applications of tries, dictionaries, parse trees, suffix trees, and pixel trees. Trees are also used in compiler intermediate representations, execution traces, and mathematical proofs. XML also uses a tree representation of data where each node has string labels.

In a rooted, ordered, static tree data structure T on t nodes where each node u has a label in the alphabet $\Sigma$. The children of node u are ranked, that is, have a left-to-right order. Tree T may be of arbitrary degree and of arbitrary shape. Basic navigational operations, such as finding the parent of u (denoted parent(u)), the ith child of u (denoted child(u, i)) and any child of u with label a denoted child(u, $\alpha$)) are important on tree data structures.

Initially, a solution for navigational operations was to represent the tree using a mixture of pointers and arrays using a total of O(t) RAM words each of size O(log t), which trivially supports such navigational operations in O(1) time taking a total of O(t log t) bits. However, these pointer based tree representations are wasteful in space.

Jacobson introduced the notion of succinct data structures, that is data structures that use space close to their information-theoretic lower bound and yet support various operations efficiently. Succinct data structures are distinct from simply compressing the input to be uncompressed later. See G. Jacobson, *Space-efficient Static Trees and Graphs*, FOCS 1989, 549-554, the contents of which are incorporated herein by reference.

Jacobson initiated this area of research with the special case of unlabeled trees, considering the structure of the trees but not the labels. Jacobson presented a storage scheme in 2t+o(t) bits while supporting the navigation operations in O(1) time. This method is also asymptotically optimal (up to lower order terms) in storage space, given the lower bound for the storage complexity of binary (unlabeled) trees of 2t-$\Theta$(log t) bits [see Jacobson 1989].

Munro and Raman extended the method of Jacobson with more efficient as well as a richer set of operations, including sub-tree size queries. See I. Munro and V. Raman, *Succinct Representation of Balanced Parentheses, Static Trees and Planar Graphs*, IEEE FOCS 1997, 118-126, herein incorporated by reference.

Other known practices have further generalized these teachings to trees with higher degrees and ever richer sets of operations, such as level-ancestor queries. Succinct representations have been invented for other data structures including arrays, dictionaries, strings, graphs, and multisets.

However, each of these practices deals with unlabeled trees. The fundamental problem of structuring labeled trees succinctly has remained un-solved, even though labeled trees arise frequently in practice. Classical applications of trees in Computer Science, whether for representing data or computation, typically generate navigational problems on labeled trees.

The information-theoretic lower bound for storing labeled trees is 2t+t log $|\Sigma|$, where the first term follows from the cost of storing the structure of the tree [see Jacobson, 1989] and the second term is the lower-bound, known to anyone with ordinary skills in the art, for the storage complexity of the node labels. For example, see R. F. Geary, R. Raman and V. Raman, Succinct Ordinarl Trees with Level-Ancestor Queries in Procl. $15^{th}$ ACM-SIAM symposium on Discrete Algorithms (SODA), pages 1-10, 2004.

Therefore, as labeled trees arise frequently in practice, there is a need in the art for a method allowing the succinct representation and efficient navigation of labeled trees.

SUMMARY OF THE INVENTION

The present invention solves the above-identified needs, as well as others, by providing a new approach to structuring labeled trees. The present invention provides a method of compressing and indexing a labeled tree of data into two coordinated arrays, one capturing the structure of the tree and the other capturing the labels of the tree. The present invention may also include performing navigational operations on the labeled tree of data after the data has been transformed. The present invention provides the first known (near) optimal results for succinct representation of labeled trees with O(1) time for navigation operations, independent of the size of the alphabet $\Sigma$ and the structure of the tree T. The tree T may be of arbitrary degree and arbitrary shape. (See Ferragina et al., *Indexing Compressed Text*, Journal of the ACM Vol. 52, No. 4, July 2005 and Ferragina et al., *Structuring labeled trees for optimal succinctness, and beyond, Proceedings of the 2005 46th Annual IEEE Symposium on Foundations of Computer Science*, the contents of which are incorporated herein by reference.

The present invention provides a succinct data structure for labeled trees based on the xbw transform using optimal (up to lower order terms) $tH_0(S_\alpha)+2t+o(t)$ bits and supporting subpath queries in time $O(|\eta| \log |\Sigma|)$ where $|\rho|$ is the length of the path. This data structure also supports navigational queries in $O(\log |\Sigma|)$ time. If $|\Sigma|=O(polylog(t))$, the subpath query takes optimal $O(|\rho|)$ time, and navigational queries take optimal O(1) time (See Ferragina et al., *Structuring labeled trees for optimal succinctness, and beyond, Proceedings of the 2005 46th Annual IEEE Symposium on Foundations of Computer Science*).

Algorithmic results based on Jacobson's method of succinctly structuring unlabeled trees to that of arrays and parentheses have become very technical, involving stratifications, tree partitioning, etc. Extending these techniques to labeled trees and the powerful subpath query would have entailed making the algorithms even more complicated.

In contrast, the present invention is simple to implement and leads beyond mere succinctness to provide both entropy-bounded as well as succinctness results in a unified framework for structuring labeled trees. Other objects, features, and advantages will be apparent to persons of ordinary skill in the art from the following detailed description of the invention and accompanying drawings.

One embodiment includes a method of compressing and indexing data within a labeled tree structure, the method comprising inputting data in a labeled tree structure; transforming the data into two coordinated arrays; and outputting the transformed data for one of compressed storage, compressed display, compressed transmission, and compressed indexing.

In another embodiment the method is capable of being applied to the transmission, of compressed labeled trees of arbitrary degree and of arbitrary shape.

In another embodiment, the data is a data format capable of being modeled as a labeled tree. The data may be XML data.

In another embodiment, the method is capable of being applied to the transmission of compressed XML data.

In another embodiment, transforming the data includes using path sorting and grouping the data to linearize the data.

In another embodiment, one array corresponds to information stored in the structure of the labeled tree, and the second array corresponds to information stored in labels of the labeled tree.

In another embodiment the method is capable of being applied to labeled trees of arbitrary degree and arbitrary shape.

In another embodiment the data is XML data. This embodiment may further include computing $XBW(d) = <\hat{S}_{last}, \hat{S}_\alpha, \hat{S}_{pcdata}>$ for the XML data; merging $\hat{S}_\alpha$ and $\hat{S}_{last}$ into $S'_\alpha$; and compressing separately $S'_\alpha$ and $\hat{S}_{pcdata}$. Alternatively, this embodiment may further include computing $XBW(d) = <\hat{S}_{last}, \hat{S}_\alpha, \hat{S}_{pcdata}>$ for the XML data; storing $\hat{S}_{last}$ using a compressed representation supporting rank/select queries; storing $\hat{S}_\alpha$ using a compressed representation supporting rank/select queries; splitting $\hat{S}_{pcdata}$ into buckets such that if two elements have the same upward path, the two elements will be in the same bucket; and compressing each bucket using any compressed full-text index. For example, FM-index may be used.

Another embodiment may include computing $XBW(d) = <\hat{S}_{last}, \hat{S}_\alpha, \hat{S}_{pcdata}>$ for the XML data; storing Blast using a compressed representation supporting rank/select queries; storing $\hat{S}_\alpha$ using a compressed representation supporting rank/select queries; and storing $\hat{S}_{pcdata}$ using a compressed data structure supporting substring searches in a sub-array of $\hat{S}_{pcdata}$ specified at a query time.

In one embodiment, the transformed data can be reconstructed from the two arrays.

Another embodiment may further include creating an array [1,n]; visiting the internal nodes of the labeled tree structure in preorder; writing in the array the level of each visited node and the position in the tree structure of a parent of each visited node; recursively sorting each upwards path of the labeled tree starting at nodes at levels≠j (mod 3) wherein j is an element of {0, 1, 2,}; sorting each upwards path starting at nodes at levels≡j mod 3 using the result from the recursive sorting; and merging the two sets of sorted paths.

This embodiment may further include reconstructing the compressed and indexed data, wherein reconstructing includes building an array F according to BuildF(xbw(T)). This embodiment may further include building an array J according to BuildJ(xbw(T)) and recovering the transformed data using the array J.

Another embodiment may further include performing at least one navigational query on the compressed indexed data. In this embodiment, the at least one navigational query includes at least one from the group consisting of querying the parent of u, querying the ith child of u, and querying the ith child of u with label c, wherein u is a node of the labeled tree, i is an integer, and c is a character. Performing the at least one navigational query may include performing GetChildren or GetParent.

Another embodiment may include counting queries over a plurality of children of a node of the labeled tree, the node having a label c. In this embodiment, counting queries may further include a sort count of (u,c) where u is a node and c is a character, and further comprise returning a result of the number of children of u being labeled c. This method may include using a variation of GetChildren.

Another embodiment includes a method of searching compressed and indexed data from a labeled tree structure, wherein the method of searching includes inputting data in a labeled tree structure; transforming the data to a compressed and indexed form including two arrays, wherein one array corresponds to the structure of the tree and the other array corresponds to the labels of the tree; receiving terms for a search of the compressed indexed data; searching the compressed indexed data, wherein searching the compressed index data includes decompressing only a small fraction of the data; and at least one from the group consisting of outputting the results of the search and counting the number of search results.

This embodiment may further include performing a SubPathSearch.

BRIEF DESCRIPTION OF THE FIGURES

For a more complete understanding of the present invention, the needs satisfied thereby, and the objects, features, and advantages thereof, reference is now made to the following description taken in connection with the accompanying drawings.

FIG. 2 illustrates a method of sorting data according to an embodiment of the present invention.

FIG. 3 illustrates a method of sorting data according to an embodiment of the present invention.

FIG. 4 illustrates an exemplary method according to an embodiment of the present invention.

FIG. 5 illustrates an exemplary method according to an embodiment of the present invention.

FIG. 6 illustrates an exemplary method according to an embodiment of the present invention.

FIG. 7 illustrates an exemplary method according to an embodiment of the present invention.

FIG. 8 illustrates an exemplary method according to an embodiment of the present invention.

FIG. 9 illustrates various features of an example computer system for use in conjunction with an embodiment of the present invention.

FIG. 10 presents an exemplary system diagram of various hardware components and other features, in accordance with an embodiment of the present invention.

FIG. 12 illustrates an exemplary embodiment of the present invention corresponding to the data of FIG. 11.

FIG. 13 illustrates an exemplary method according to an embodiment of the present invention.

FIG. 14 illustrates an exemplary method according to an embodiment of the present invention.

FIG. 15 illustrates an exemplary method according to an embodiment of the present invention.

FIG. 16 illustrates an exemplary method according to an embodiment of the present invention.

DETAILED DESCRIPTION

FIG. 1(a) illustrates an example of a labeled tree T.

For a labeled tree T of arbitrary fan-out, depth, and shape, having n internal nodes labeled with symbols drawn from a set $\Sigma_N=\{A, B, \ldots\}$, and l leaves labeled with symbols drawn from $\Sigma_L=\{a, b, c, \ldots\}$, the present invention assumes that $\Sigma_N \cap \Sigma_L \neq 0$, so that internal nodes can be distinguished from leaves directly from their labels. $\Sigma$, the set of labels effectively used in T's nodes, is set as $\Sigma=\Sigma_N \cup \Sigma_L$. The symbols in $\Sigma$ are encoded with integers in the rage $[1, |\Sigma|]$ ($\Sigma_N$'S first symbol). A preliminary bucket sorting step may be needed in order to compute this labeling. The overall size of T is $t=n+l$ nodes. For each node u, $\alpha[u]$, which is an element of $\Sigma$ denotes the label of u, and $\pi[u]$ denotes the string obtained by concatenating the symbols on the upward path from u's parent to the root of T.

$\pi[u]$ is formed by labels of internal nodes only. As sibling nodes may be labeled with the same symbol, many nodes in T may have the same $\pi$-string. For example, in FIG. 1, two nodes are labeled B whose upward path is A.

The present invention comprises a method including the step of creating a sorted multiset S consisting of t triplets for each node. S is created by first visiting T in pre-order and, for each visited node u, inserting the triplet $s[u]=<last[u], \alpha[u], \pi[u]>$ in S, where last[u] is a binary flag set to 1 if u is the last child of its parent in T. Then, S is stably sorted lexicographically according to the $\pi$-component of its triplets. As noted above, the same triplet may appear more than once because siblings nodes may have the same label. Thus, the stability of the sorting procedure assists in preserving the identity of triplets after the sorting step.

Figure 1:
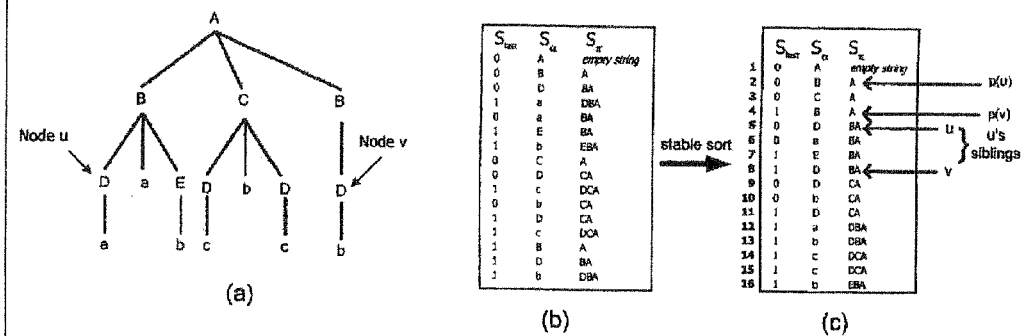
FIG. 1 illustrates a labeled tree and an exemplary array according to an embodiment of the present invention.

Hereinafter $S_{last}[i]$ (resp. $S_\alpha[i]$, $S_\pi[i]$) to refer to the last (resp. $\alpha$, $\pi$) component of the i-th triplet of S. An example for a tree structure is shown in FIG. 1.

The sorted set $S[1, t]$ includes the following properties: $S_{last}$ has n bits set to 1 (one for each internal node); the other t−n bits are set to 0; $S_\alpha$ contains all the labeled nodes of T; and $S_\pi$ contains all the upward labeled paths of T. Each path is repeated a number of times equal to the number of its offspring. Thus, $S_\alpha$ is a lossless serialization of the labels of T whereas $S_{last}$ provides information on the groupings of the children of T's nodes.

The following structural properties of T can be inferred from S's sorting:

1. The first triplet of S refers to the root of T.
2. If u' and u" are two nodes of T such that $\pi[u']=\pi[u"]$, nodes u' and u" have the same depth in T, and u' is to the left of u" if the triplet s[u'] precedes the triplet s[u"] in S.
3. If $u_1, \ldots, u_c$ are the children of a node u in T, the triplets $s[u_1], \ldots, s[u_c]$ lie contiguously in S following this order. Moreover, the last triplet $s[u_c]$ has its last-component set to 1, whereas all the other triplets have their last-component set to 0.
4. If $v_1, v_2$ denote two nodes of T such that $\alpha[v_1]=\alpha[v_2]$, and $s[v_1]$ precedes $s[v_2]$ in S, then the children of $v_1$ precede the children of $v_2$ in S.

This transform of the labeled tree T will be hereinafter denoted by xbw(T). Xbw(T) denotes the pair $<S_{last}, S_\alpha>$. $S_{last}$ is a binary string of length t and $S_\alpha$ is a permutation of the t labels associated to the nodes of T. T can be recovered from $S_{last}$ and $S_\alpha$, therefore, xbw is an invertible transform.

The xbw transform includes taking $t \log |\Sigma|$ bits for $S_\alpha$, plus t bits for $S_{last}$.

In one embodiment, the internal nodes and leaves may be labeled using one unique alphabet (ie. $\Sigma_N=\Sigma_L$). Then, an additional bit array of length t is needed to distinguish between leaves and internal nodes in $S_\alpha$. The overall space is then $2t+t \log |\Sigma|$. This is optimal up to lower order terms because the information theoretic lower bound on the space for representing a t-node ordinal tree is $2t-O(\log t)$ bits, and the term $t \log |\Sigma|$ is the optimal cost of representing the labels in the worst case.

However, labeling leaves and internal nodes with two distinct alphabets simplifies the algorithms applied in the transform. The space cost of the additional bit array does not asymptotically influence the final bounds.

Converting T to xbw(T)

For the computation of xbw (T), explicitly building S would require a large amount of space and time. For example, in a degenerate tree with a single path of t nodes, the overall size of $S_\pi$ would be $\Theta(t^2)$. The construction of S in a preferred embodiment of the present invention is therefore not explicit. In this preferred embodiment, the method includes sorting the $\pi$-components using an algorithm somewhat similar to the skew algorithm for suffix array construction. See J. Kärkkäinen and P. Sanders, *Simple Linear Work Suffix Array Construction*, Procl. ICALP, 943-955, 2003, the contents of which are incorporated herein by reference. However, in the original skew algorithm, the recursion consists of sorting all suffixes starting at positions$\neq 1$ (mod 3), whereas the present invention works equally well if instead of 1, 0 or 2 are used.

Referring to FIG. 3, step S1 involves creating the array IntNodes[1, n] which is initially empty. Step S2 includes visiting each of the internal nodes of T in preorder and writing in IntNodes[i] the symbol $\alpha[u]$, the level of u in T, and the position in IntNodes of u's parent, where u is the ith visited node.

In step S3, j is defined as an element of $\{0, 1, 2\}$ such that the number of nodes in IntNodes whose level is $=j \pmod 3$ is at least n/3. In step S4, the upwards paths are sorted recursively starting at nodes at levels$\neq j \pmod 3$.

In step S5, the upwards paths are sorted starting at levels$=j \pmod 3$. using the result of step S4. Finally, in step S6, the two sets of sorted paths are merged. In steps S3 and S4, the parameter j is chosen in such a way that the number of nodes being at level$=j \pmod 3$ is at least t/3.

A lexicographic name is assigned to each path according to its first three symbols, wherein the symbols are obtained using the parent pointers. For example, radix sort may be used to assign the lexicographic names.

Then, a new "contracted" tree is built, whose labels are the names previously assigned. Based on the choice of j, the new tree will have at most 2t/3 nodes. The new tree will have a fan-out larger tan the original one. However, this does not affect the algorithm that only uses parent pointers.

This method runs in optimal O(t) time and uses O(t log t) bits of space. The running time satisfies the recurrence $T(t)=T(2t/3)+\Theta(t)$ and is therefore $\Theta(t)$. Once the $\pi$-components have been sorted, $S_{last}$ and $S_\alpha$ may be constructed simply.

Reconstructing T from xbw(T)

As noted above, xbw is an invertible transform and T can be recovered. The method of reconstruction of T given xbw(T)$=<S_{last}, S_\alpha>$ in O(t) time involves three phases. In the first phase, an array $F[1, |\Sigma_N|]$ is built which approximates $S_\pi$ at its first symbol. For every internal-node label x which is an element of $\Sigma_N$, F[x] stores the position in S of the first triplet whose $\pi$-component is prefixed by x. For example, in FIG. 1, F[B]=5, because the fifth triplet in S is the first one having its $\pi$-component prefixed by B.

In the second phase, an array J[1, t] is built which allows a "jump" in s from any node to its first child. J[i] is set as J[i]=j if S[i] is an internal node and S[j] is the first child of s[i]. If S[i] is a leaf, J[i] is set as J[i]=−1. For example, in FIG. 1, J[5]=12, because node u has corresponding triplet S[5] and first (and unique) child represented by S[12].

In the third phase, the original tree T is recovered using array J.

A. First Phase

The array $F[1, |\Sigma_N|]$ is computed in O(t) time using the following method including BuildF(xbw(T)), as shown in FIG. 4. First, an array C is initialized so that C[i] stores the number of occurrences of symbol i in $S_\alpha$. Then, F[i+1] is computed inductively given F[i].

As shown in step 2 of BuildF(xbw(T)), F[1] is set as F[1]=2 because $S_\pi[1]$ is the empty string, which occurs only once in $S_\pi$, and $S_\pi[2]$ is therefore prefixed by symbol 1. In connection with step 4, it is assumed that F[i] is the position of the first entry in $S_\pi$ prefixed by symbol i. There are C[i] internal nodes labeled by i and their children occur contiguously in S starting at position F[i]. Thus, the last entry in $S_\pi$ prefixed by i is the one corresponding to the C[i]th 1 in $S_{last}$ counting from position F[i]. The loop in steps 6-8 serves the purpose of counting C[i] is starting from $S_{last}$[F[i]]. Therefore, the value F[i+1] is correctly set at step 9.

B. Second Phase

In the second phase of the inversion method, the array J[1, t] is computed in O(t) time. This phase makes use of the properties of the xbw transform that the k-th occurrence of the symbol j, which is an element of $\Sigma_N$, in $S_\alpha$ corresponds to the k-th group of siblings counting from position F[j]. This allows a computation of J with a simple scan of the array $S_\alpha$, as shown below in BuildJ(xbw(T)), as illustrated in FIG. 5. The use of an additional auxiliary array is avoided by updating the entries of F by maintaining the invariant that, for every j that is an element of $\Sigma_N$, F[j] is the position of the first child of the next occurrence of symbol j in $S_\alpha$, as shown in step 9.

C. Third Phase

In the third phase, T is recovered given $S_\alpha$, $S_{last}$ and the array J. T may be represented in several ways. For example, the nodes of T may be listed in depth-first order, using a stack Q in which pop/push pairs <i, u> where I denotes the position of the node in S and u denotes the node label. For each popped node <i, u>, arrays J and $S_\alpha$ can be used to locate its children (if any) and insert them in the stack in reverse order.

Navigational Operations on Transformed Data

The present invention provides a method of producing a succinct data structure for data included in labeled trees that uses at most 2t log $|\Sigma|$+O(t) bits and that supports all navigational queries such as—parent(u), child(u, i), and child(u, α)—in optimal O(1) time. The space used is nearly optimal for any $\Sigma$, being at most twice the information theoretic lower bound of t log $|\Sigma|$+2t.

Using a succinct representation of $S_\alpha$ and $S_{last}$, in connection with an additional array, allows navigation over T following node labels or the ranking of nodes among their siblings. This involves the use of rank and select operations over arbitrary sequences. Given a sequence S[1, t] over an alphabet $\Sigma$, $rank_c(S, q)$ is the number of times the symbol c which is one of the set $\Sigma$ appears in $S[1, q]=s_1 s_2 \ldots s_q$, and $select_c(S, q)$ is the position of the q-th occurrence of the symbol c which is one of the set $\Sigma$ in S.

One of ordinary skills in the art may notice that any compressed data structure efficiently supporting $rank_c$ and $select_c$ queries over a string s could be plugged onto our XBW transform to get a space/time efficient solution for the navigation and search operations over labeled trees. Hereafter we discuss two possible instantiations of rank/select data structures based on some results currently known in the literature. It goes without saying that the proposed approach is not limited to these two specific instantiations but it could deploy, and thus benefit of, any advancement in the field of rank/select data structures. (See R. Raman, V. Raman, and S. Srinivasa Rao, Succinct indexable dictionaries with applications to encoding k-ary trees and multisets. In Proc. 13th ACM-SIAM Symposium on Discrete Algorithms (SODA), pages 233-242, 2002, the entire contents of which is incorporated herein by reference).

For $|\Sigma|$=O(polylog(t)), the generalized wavelet tree in [P. Ferragina, G. Manzini, V. Makinen, and G. Navarro. An alphabet-friendly FM-index. In Proc. Symposium on String Processing and Information Retrieval (SPIRE), pages 150-160. Springer-Verlag LNCS n. 3246, 2004.] supports $rank_c$ and $select_c$ queries in O(1) time using $|s|H_0(s)\pm o(|s|)$ bits of space, where $H_0(s)$ denotes the 0th order empirical entropy of the sequence s. (See P. Ferragina, G. Manzini, V. Makinen and G. Navarro. An alphabet-friendly FM-index. In Proc. 11th Symposium on String Processing and Information Retrieval (SPIRE '04), pages 150-160, Springer-Verlag LNCS n. 3246, 2004. To appear in "ACM Transactions on Algorithms", see also Tech. Report of Univ. Chile #TR/DCC-2004-5, 2004, the entire contents of which incorporated herein by reference).

For general $\Sigma$, the wavelet tree in [R. Grossi, A. Gupta, J. S. Vitter. High-order entropy-compressed text indexes. In Proc. ACM-SIAM Symposium on Discrete Algorithms (SODA), pp. 841-850, 2003] supports $rank_c$ and $select_c$ queries in $O(\log |\Sigma|)$ time using $|s|H_0(s) o(|s|)$ bits of space, where $H_0(s)$ denotes the 0th order empirical entropy of the sequence s. (See R. Grossi, A. Gupta, J. Vitter, High-Order Entropy-Compressed Text Indexes. Proc. 14th ACM-SIAM Symposium on Discrete Algorithms (SODA), 841-850, 2003, the entire contents of which is incorporated herein by reference).

These data structures support the retrieval of $s_i$ for any i in the same time as the rank and select queries.

Based on the array F, we define the binary array A[1, f] such that A[j]=1 iff j=F[x] for some x which is an element of $\Sigma_N$. In other words, the ones in A mark the positions j such that the first symbol of $S_\pi[j]$ differs from the first symbol of $S_\pi[j-1]$.

FIG. 6 illustrates a method for computing the range (First, Last) such that S[First], S[First+1], . . . , S[Last] are the children of node S[i]. The method returns −1 if S[i] is a leaf of T.

Given an index i, $1 \leq i \leq t$, the algorithm GetChildren in FIG. 6 computes the range of rows (First, Last) such that S[First], S[First+1], . . . , S[Last] are the children of node S[i]. The algorithm returns −1 if S[i] is a leaf. As shown in step 2, c denotes the label of node S[i]. F[c] is computed, the first position of $S_\pi$ whose starting symbol is c, in Step 3. Then k, the number of occurrences of c in $S_\alpha$ up to and including the position $S_\alpha$[i], is computed in Step 4. By the properties of the xbw transform, the children of S[i] are the k-th group of siblings counting from position F[c]. In Steps 5-7 the position of the first and last child of S[i] are correctly computed.

For example, the method in FIG. 6 may be applied to the example tree in FIG. 1 to pick the node p(v), the parent of v associated with the triplet S[4]. In this example, i=4, c=B, and y=5 since S[5] is the first triplet having $\pi$-component that starts with B, and k=2 and z=1. Thus, the children of p(v) are the second group of children counting from S[5]. As shown by this example, the method reports correctly First=$select_1(S_{last}, 2)+1=8$ and Last=$select_1(S_{last}, 3)=8$. Thus, p(v) has a single child (i.e. v) located at S[8].

FIG. 7 illustrates a method for computing the index p such that S[p] is the parent of S[i]. The algorithm returns −1 if S[f] is the root of T.

Given an index i, $1 \leq i \leq t$, the method GetParent in FIG. 7 computes the index p such that S[p] is the parent node of S[i]. The method returns −1 if i=1, since S[1] is the root of T, as shown in Step 1. Otherwise, the method first finds the symbol c associated with the parent of S[1]. This symbol is $S_\pi[i]$ and is retrieved by means of array A, in Step 2. In Steps 3-4 the number k of groups of siblings from position F[y] to position i is computed. In Step 5, by the properties of xbw transform we know that the index p of i's parent is the position of the (k+1)-th occurrence of symbol c in $S_\alpha$ (Step 5).

The method in FIG. 7 may be applied to the tree in FIG. 1 to consider the node v associated with the triplet S[8]. We have c=2 (symbol B), y=5, k=1, thus we correctly compute p=select$_B(S_\alpha, 2)$=5.

There is a technical detail to achieve constant time rank and select queries over $S_\alpha$. Recall that $\Sigma_N$ is mapped onto the range $[1, |\Sigma_N|]$. If B is a binary sequence of length $|\Sigma_N|$t such that, for c is an element of $\Sigma_N$, then B[t(c−1)+i]=1 iff $S_\alpha[i]$=c. In other words, B consists of $|\Sigma_N|$ segments of length t such that the x-th segment is a bitmap for the occurrences of the symbol x in $S_\alpha$. If occ is an array of size n storing in occ[c] the number of occurrences in $S_\alpha$ of symbols smaller than c, which is an element of $\Sigma_N$. It is easy [12] to verify that for c, which is an element of $\Sigma_N$ $$\text{rank}_c(S_\alpha, i) = \text{rank1}(B, c|\Sigma_N|+i) - \text{occ}[c];$$

$$\text{select}_c(S_\alpha, i) = \text{select1}(B, \text{occ}[c]+i) - c|\Sigma_N|.$$

Using rank$_1$ and select$_1$ operations over B one can answer in O(1) time rank$_c$ and select$_c$ queries over $S_\alpha$ for any symbol c, which is an element of $\Sigma_N$ (note that algorithms GetChildren and GetParent do not need rank$_c$ and select$_c$ operations for symbols c associated to leaves).

For any alphabet $\Sigma$, there exists a succinct representation for xbw(T) that takes at most $tH_0(S_\alpha)+2t+o(t)$ bits and supports parent(u), child(u, i) and child(u, $\alpha$) queries in O(log $|\Sigma|$) time. If $|\Sigma|$=O(polylog(t)), navigational queries take O(1) time.

Subpath Search in xbw(T)

The present invention provides a new, powerful operation: subpath query. Given a path p of labels from $\Sigma$, the subpath query returns all nodes u, which is an element of T such that there exists a path leading to u labeled by p. Note that u and the origin of p could be internal to T. Subpath query is of central interest to the XPATH query language in XML and is also used as a basic block for supporting more sophisticated path searches. Still, no prior method is known for supporting subpath queries on trees represented succinctly.

In finding the nodes u of T whose upward path, i.e., the path obtained by concatenating the labels from u to the root, is prefixed by the string $\beta=q_1 \ldots q_k$, with $q_i$, which is an element of $\Sigma_N$. (Subpath queries with downward paths can be handled by reversing the path in the query.) This embodiment of the present invention implicitly counts the number of subpaths matching $\beta$ in T. Because of the sorting of S, the triplets corresponding to the nodes in the output of the subpath query are contiguous in S. Their range is denoted with S[First, Last], so that $S_\pi$[First, Last] are exactly the rows of $S_\pi$ prefixed by $\beta$.

FIG. 8 illustrates this subpath query method of Computing S[a, b] as the set of triplets representing the parents of nodes with paths prefixed by $q_1 \ldots q_k$.

The method of SubPathSearch in FIG. 8 involves computing the range [First, Last] in k phases numbered from k to 1. Each phase preserves the following invariant: At the end of the i-th phase the parameter First points to the first row of S such that $S_\pi$[First] is prefixed by $q_i \ldots q_k$ and the parameter Last points to the last row of S such that $S_\pi$[Last] is prefixed by $q_i \ldots q_k$. For i=k, First and Last are determined via the array F such that F[c] is the first position of $S_\pi$ prefixed by the symbol c. The inductive step assumes that [First, Last] is the range of rows whose $\pi$-component is prefixed by $q_i+_1 \ldots q_k$, and then computes the range of rows [First', Last'] whose $\pi$-component is prefixed by $q_i q_i+1 \ldots q_k$ as follows. Let $k_1$ (resp. $k_2$) denote the first (resp. last) occurrence of symbol $q_i$ in $S_\alpha$[First, Last] (hence we have First$\leq k_1 \leq k_2 \leq$Last and $S_\alpha[k_1]=S_\alpha[k_2]=q_i$). By properties of the xbw transform according to an embodiment of the present invention, First' is the position of the first child of node $S[k_1]$ and Last' is the position of the last child of $S[k_2]$. The main loop of algorithm SubPathSearch, as shown in Steps 3-9, computes the new range [First', Last'] using essentially the same computation as GetChildren.

Thus, a subpath search can be performed for a string $\beta$ in O($|\beta|$ log $|\Sigma|$) time for a general alphabet $\Sigma$, and in optimal O($|\beta|$) time if $|\Sigma|$=O(polylog(t)).

Tree Entropy and Compression

The present invention goes beyond succinctness and provides for data structuring labeled trees using bits proportional in number to the inherent entropy of the tree as well as the labels. For a string of symbols, the notion of entropy is well developed, understood, and exploited in indexing and compression: high-order entropy depends on frequency of occurrences of substrings of length k. For trees, there is information or entropy in the labels as well as in the subtree structure in the neighborhood of each node. The simplest approach to labeled tree compression is to serialize it using say pre or postorder traversal to get a sequence of labels and apply any known compressor such as gzip. This is fast and is used in practice, but it does not capture the entropy contained in the tree structure. Another approach is to identify repeated substructures in the tree and collapse them a la Lempel-Ziv methods for strings. Such methods have been used for grammar-based compression, but there is no provable information-theoretic analysis of the compression obtained.

A more formal approach is to assume a parent-child model of tree generation in which node labels are generated according to the labels of their parents, or more generally, by a descendant or ancestor subtree of height k, for some k. From these approaches heuristic algorithms for tree compression have been derived and validated only experimentally. In XML compression, well-known software like XMILL and XMLPPM, group data according to the labeling path leading to them and then use specialized compressors ideal for each group. The length k of the predictive paths may be selected manually or automatically by following the classical PPM paradigm. However, even for these simplified approaches, no formal analysis of achievable compression is known. Despite work on labeled tree compression methods in multiple applied areas, there is no theory of achievable compression with associated lower and upper bounds for trees.

The present invention enables a more formal analysis of labeled tree compression. Based on the standard parent-child model of tree generation we define the kth order empirical entropy $H_k(T)$ of a labeled tree T that mimics on trees, in a natural way, the well-known definition of kth order empirical entropy over strings. Further, based on the xbw transform according to an embodiment of the present invention, an method is provided to compress (and uncompress) T in O(t) time, getting a representation with at most $tH_k(T)+2.01t+o(t)$ bits. This is off from the lower bound of representing just the tree without labels (roughly 2t) by a factor that mainly depends on the entropy of the instance and may be significantly smaller than the $O(\log |\Sigma|)$ term that is the worst case over all inputs. While such results have been previously known for string compression, the present invention is the first application of entropy-based compression for trees. Again, these results rely on the xbw transform.

The locality principle exploited in universal compressors for strings is that each element of a sequence depends most strongly on its nearest neighbors, that is, predecessor and successor. The context of a symbol s is therefore defined on strings as the substring that precedes s. A k-context is a context of length k. The larger is k, the better should be the prediction of s given its k-context. The theory of Markov random fields extends this principle to more general mathematical structures, including trees, in which case a symbol's nearest neighbors are its ancestors, its children or any set of nearest nodes. In what follows we extend, in a natural way, the notion of k-context for string data to the notion of k-context for labeled-tree data. Letting $\pi[u]$ be the context of node u; the k-context of u is the k-long prefix of $\pi[u]$ denoted by $\pi k[u]$. The context $\pi k[u]$ should be a good predictor for the labels that might be assigned to u. A larger k induces a better prediction. Similar to string data, similarly labeled nodes descend from similar contexts, and that the similarity of contexts is proportional to the length of their shared prefix.

Node labels get distributed in xbw(T) according to a pattern that clusters closely the similar labels. Given the sorting of S the longer is the shared prefix between $\pi[u]$ and $\pi[v]$, for any two nodes u and v, the closer are the labels of u and v in $S_\alpha$. There is a powerful homogeneity property over $S_\alpha$ that is the analog of the properties of the standard Burrows-Wheeler transform on strings for labeled trees.

To measure the compressibility of a labeled tree, we proceed as follows. Let $\beta$ be a string drawn from an alphabet of h symbols, and let bi be the number of occurrences of the ith symbol in $\beta$. We define the zeroth order empirical entropy on strings as usual: $H_0(\beta)=\Sigma^h_{i=1}(b_i/|\beta|) \log (b_i/|\beta|)$. Given $H_0$, the k-th order empirical entropy on labeled trees can be defined. For any positive integer k, the notation cover[p] can be used to denote the string of symbols labeling nodes in T whose context is prefixed by the string $\rho$. Set $H_k(T)=|\text{cover}[\rho]| H_0(\text{cover}[\rho])$, where $\rho$ is $\rho$ is an element of $\Sigma^k$. Thus, $H_k(T)$ extends to labeled trees the notion of kth order empirical entropy introduced for strings, with the k-contexts reinterpreted "vertically" by reading the symbols labeling the upward paths.

Given the structure of xbw(T), for any k, the concatenation of strings cover[$\rho$] for all possible $\rho$ where $\rho$ is an element of $\Sigma^k$ taken in lexicographic order, gives the string $S_\alpha$. This is therefore the strong property holding for the BW transform here generalized to labeled trees. As a consequence and given the definition of $H_k$, tree compression problems up to $H_k(T)$ can be treated similarly to a string compression problem up to $H_0$. This enables all the machinery developed for string data to be applied to tree compression.

In locating the strings cover[$\rho$] within $S_\alpha$. For a fixed k, it is enough to use the longest common prefix (lcp) information derived from the PathSort method. The substrings cover[$\rho$] are delimited by lcp-values smaller than k, and provide a partition of $S_\alpha$. As an alternative, an adaptation of the compression boosting technique may be used which finds an optimal partition of $S_\alpha$ ensuring a compression bounded by $H_k(T)$ for any positive k.

If A is a compressor that compresses any string w into $|w|H_0(w)+\mu|w|$ bits, then the string xbw(T) can be compressed in $tH_k(T)+t(\mu+2)+o(t)+g_k$ bits, where $g_k$ is a parameter that depends on k and on the alphabet size (but not on $|w|$). The bound holds for any positive k, whereas the approach is independent of k. The time and space complexities are both O(t) plus the time and space complexities of applying A over a t-symbol string.

Thus, the present invention uses path-sorting and grouping to linearize data in the form of a labeled tree T into two coordinated arrays, one capturing the structure of the data and the other the labels of the data. Using the properties of the xbw transform, provides the first-known (near-)optimal results for succinct representation of labeled trees with O(1) time for navigation operations, independent of $\Sigma$ and the structure of T; optimally supports the powerful subpath search operation for the first time; and introduces a notion of tree entropy and present linear time algorithms for compressing a given labeled tree up to its entropy beyond the information-theoretic lower bound averaged over all tree inputs.

FIG. 9 shows various features of an example computer system for use in conjunction with an embodiment of the present invention. The computer system is used by a user 101 to access data, make calculations, and perform other steps in accordance with methods of the present invention, such as by using software and other computer features located on a server or other network device 106. Access occurs, for example, via a terminal 102, network (e.g., the Internet) 110, and couplings 111, 113. The terminal 102 may comprise, for example, a personal computer (PC), minicomputer, mainframe computer, microcomputer, telephone device, personal digital assistant (PDA), or other device having a processor and input capability. The server 106 may comprise, for example, a PC, minicomputer, mainframe computer, microcomputer, or other device having a processor and a repository for data or that is capable of accessing a repository of data. Couplings 111, 112 may include wired, wireless, or fiberoptic links.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 10.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Example embodiments of the present invention have now been described in accordance with the above advantages. It will be appreciated that these examples are merely illustrative of the invention. Many variations and modifications will be apparent to those skilled in the art.

Compression and Searching XML Data

XML is fast becoming the standard format to store, exchange, and publish data over the Web. XML data is also often included or embedded or in applications. XML is popular because it encodes a considerable amount of metadata in its plain-text format. Thus, applications can be more savvy about the semantics of the items in the data source. However, XML presents two challenges: size—the XML representation of a document is significantly larger than its native state, and search complexity—XML search involves path and content searches on labeled tree structures.

These challenges occur because, first, XML documents have a natural tree structure, and many of the basic tasks that are easy on arrays and lists—such as indexing, searching, and navigation—become more involved. Second, XML documents are wordy by design, repeating nearly the entire schema description for each data item. Thus, XML can be inefficient and burden a company's network, processor, and storage infrastructures. Finally, XML documents have mixed elements with both text and numerical or categorical attributes causing XML queries to be richer than commonly used SQL queries. For example, XML queries may include path queries on the tree structure and substring queries on contents.

In an exemplary embodiment, the present invention can be applied to provide access to contents, navigation, and searching of XML data in compressed form. Using the above described methods, a succinct tree representation can be used to design and implement a compressed index for the XML data, in which the XML data is maintained in a highly compressed format. Navigation and searching can be performed by uncompressing only a tiny fraction of the data. As discussed above, this method involves compressing two arrays derived from the XML data. This embodiment of the present invention overcomes the prior problems associated with XML data by providing a compression ration up to 35% better than the ones achievable by previous methods and enabling search operations that are orders of magnitudes faster. For example, search operations with the present invention may be performed in a few milliseconds over hundreds of MBs of XML files whereas previous methods only provide for search operations on standard XML data sources typically require tens of seconds.

As the relationships between elements in an XML document are defined by nested structures, XML documents are often modeled as trees whose nodes are labeled with strings of arbitrary length drawn from a usually large alphabet $\Sigma$. These strings are called tag or attribute names for the internal nodes, and content data for the leaves (shortly Pcdata). Thus, managing XML data or documents requires efficient support of navigation and path expression search operations over their tree structure.

Exemplary navigation operations are:

Find the parent of a given node u, find the ith child of u, or find the ith child of u with some label.

Exemplary path expressions are, basic search operations that involve structure and content of the XML document tree such as:

Given a labeled subpath $\pi$ and a string $\gamma$, find either the set of nodes N descending from $\pi$ in d ($\pi$ may be anchored to any internal node, not necessarily tree's root), or the occurrences of string $\gamma$ as a substring of the Pcdata contents of N's nodes.

Previous methods of finding parents and children nodes in the tree involved a mixture of pointers and hash arrays which are both space and time consuming. Navigation required a scan of the whole document. Certain methods increased navigation in succinct space but did not support search operations or provided for certain search operations but greatly increased the required space. Compressors provided for compression, but required scanning of the entire document and decompression of large portions of the document to perform searching and navigation.

Applying the method of the present invention to XML data overcomes the time-efficient versus space-efficient dichotomy by applying a modified xbw transform to XML data in order to represent a labeled tree using two arrays. The first array contains the tree labels arranged in an appropriate order. The second array is a binary array encoding the structure of the tree.

In this embodiment, the xbw transform is modified to better exploit the features of XML documents.

A collection of XML compression and indexing functions may be created and stored in a library. The library may then either be included in software, or it can be directly used at the command-line with a full set of options for compressing, indexing, and searching XML documents.

Figure 11:
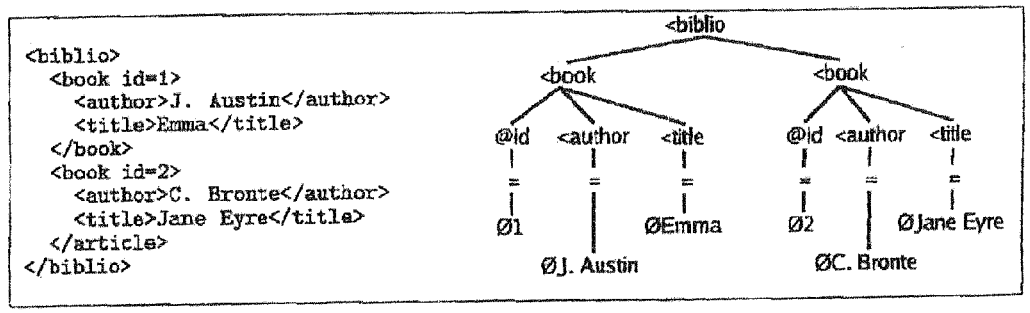
FIG. 11 illustrates an example of XML data with its labeled tree modeling.

FIG. 11 illustrates an example of XML document d (left) and its corresponding ordered labeled tree structure T (right).

This embodiment of the XBW transform as a compressor, one embodiment of which is illustrated as XBzip in FIG. 14 is an attractively simple compressor, that relies on standard compression methods to handle the two arrays in the XBW transform.

Studies show that this is comparable in its compression ratio to the state-of-the-art XML-conscious compressors (which tend to be significantly more sophisticated in employing a number of heuristics to mine some structure from the document in order to compress "similar contexts"). In contrast, the XBW transform automatically groups contexts together by a simple sorting step involved in constructing the two arrays. In addition, XBzip is a principled method with provably near-optimal compression.

A second embodiment of the present invention applied to XML data is illustrated in FIG. 15 as a compressed index XBzipIndex. This supports navigation and search queries very fast uncompressing only a tiny fraction of the document. Compared to similar tools like XGrind, Xpress and Xqzip, the compression ratio of XBzipIndex is up to 35% better, and its time performance on SubPathSearch and ContentSearch search operations is order of magnitudes faster: few milliseconds over hundreds of MBs of XML files versus tens of seconds (because of the scan of the compressed data inherent in these comparable tools). The implementation of XBzipindex is more challenging since in addition to the XBW transform, it requires data structures to support rank and select operations over the two arrays forming XBW. These embodiments introduce the new approach of treating the arrays as strings and employing a state-of-the-art string indexing tool (e.g. the FM-index) to support structure+content search operations over the document tree. This new approach of XBzipindex has many benefits since string indexing is a well-understood area; in addition, we retain the benefits of in being principled, with concrete performance bounds on the compression ratio as well as time to support navigation and search operations.

XBzipIndex has additional features and may find other applications besides compressed searching. For example, it supports tree navigation (forward and backward) in constant time, allows the random access of the tree structure in constant time, and can explore or traverse any subtree in time proportional to their size. This could be used within an XML visualizer or within native-XML search engines such as XQueC and F&B-index. There are more general XML queries like twig or XPath or XQuery; and XBzipIndex can be used as a core to improve the performance of known solutions. Another such example is that of structural joins which are key in optimizing XML queries. Previous work involving summary indexes, or node-numbering such as Vist or Prüfer are improved using XBzipIndex.

A. Compact Representation of DOM Trees

Given an arbitrary XML document d, an ordered labeled tree T which is equivalent to the DOM representation of d consists of four types of nodes defined as follows:

1. Each occurrence of an opening tag <t> originates a tag node labeled with the string <t.

2. Each occurrence of an attribute name a originates an attribute node labeled with the string @a.

3. Each occurrence of an attribute value or textual content of a tag, say ρ, originates two nodes: a text-skip node labeled with the character =, and a content node labeled with the string Øρ, where Ø is a special character not occurring elsewhere in d.

The structure of the tree T is defined as follows (see FIG. 11). An XML well-formed substring of d, say $\sigma$=<t $a_1$="$\rho_1$" ... $a_k$="$\rho_1$">τ</t>, generates a subtree of T rooted at a node labeled <t. This node has k children (subtrees) originating from t's attribute names and values (i.e. @ai→=→ρi), plus other children (subtrees) originating by the recursive parsing of the string τ. Note that attribute nodes and text-skip nodes have only one child. Tag nodes may have an arbitrary number of children. Content nodes have no children and thus form the leaves of T.

1. The XBW Transform for XML Data

Tree T can be compactly represented by adapting the XBW transform discussed above. The XBW transform uses path-sorting and grouping to linearize the labeled tree T into two arrays. As shown in, this "linearized" representation is usually highly compressible and efficiently supports navigation and search operations over T. Note that we can easily distinguish between internal-node labels vs. leaf labels because the former are prefixed by either <, or @, or =, whereas the latter are prefixed by the special symbol Ø.

Let n denote the number of internal nodes of T and let l denote the number of its leaves, so that the total size of T is t=n+l nodes. For each node u, which is an element of T, let $\alpha[u]$ denote the label of u, last[u] be a binary flag set to 1 if and only if u is the last (rightmost) child of its parent in T, and π[u] denote the string obtained by concatenating the labels on the upward path from u's parent to the root of T.

To compute the XBW transform we build a sorted multi-set S consisting of t triplets, one for each tree node (see FIG. 12). Hereafter we will use $S_{last}[i]$ (resp. $S_\alpha[i]$, $S_\pi[i]$) to refer to the last (resp. α, π) component of the i-th triplet of S. To build S and compute the XBW transform involves the following:

1. Visit T in pre-order; for each visited node u insert the triplet s[u]=<last[u], α[u], π[u]> in S;

2. Stably sort S according to the π-component of its triplets;

3. Form XBW(d)=<$\hat{S}_{last}$, $\hat{S}_\alpha$, $\hat{S}_{pcdata}$>, where $\hat{S}_{last}$=$S_{last}$[1, n], $\hat{S}_\alpha$=$S_\alpha$[1, n], and $\hat{S}_{pcdata}$=$S_\alpha$[n+1, t].

Since sibling nodes may be labeled with the same symbol, several nodes in T may have the same π-component (see FIG. 11). The stability of sorting at Step 2 is thus needed to preserve the identity of triplets after the sorting. The sorted set S[1, t] has the following properties: (i) Slast has n bits set to 1 (one for each internal node), the other t−n bits are set to 0; (ii) $S_\alpha$ contains all the labels of the nodes of T; (iii) $S_\pi$ contains all the upward labeled paths of T (and it will not be stored). Each path is repeated a number of times equal to the number of its offsprings. Thus, $S_\alpha$ is a lossless linearization of the labels of T, whereas $S_{last}$ provides information on the grouping of the children of T's nodes.

We notice that the XBW transform defined in Step 3 is slightly different from the one introduced in [11] where XBW is defined as the pair $<S_{last}, S_\alpha>$. The reason is that here the tree T is not arbitrary but derives from an XML document d. Indeed we have that $S_\alpha[1, n]$ contains the labels of the internal nodes, whereas $S_\alpha[n+1, t]$ contains the labels of the leaves, that is, the Pcdata. This is because if u is a leaf the first character of its upward path $\pi[u]$ is = which we assume is lexicographically larger than the characters < and @ that prefix the upward path of internal nodes (see again FIG. 12). Since leaves have no children, we have that Slast[i]=1 for i=n+1, ..., t. Avoiding the wasteful representation of $S_{last}$ [n+1, t] is the reason for which in Step 3 we split $S_\alpha$ and $S_{last}$ into $<\hat{S}_{last}, \hat{S}_{\alpha\_}, \hat{S}_{pcdata}>$.

As described above, a linear time algorithm for retrieving T given $<S_{last}, S_\alpha>$. Since it is trivial to get the document d from XBW(d) we have that XBW(d) is a lossless encoding of the document d. XBW(d) takes at most (17/8)n+1 bytes in excess to the document length. However, this is an unlikely worst-case scenario since many characters of d are implicitly encoded in the tree structure (i.e., spaces between the attribute names and values, closing tags, etc).

XBW(d) was usually about 90% the original document size. Moreover, the arrays $\hat{S}_{last}$, $\hat{S}_a$, and $\hat{S}_{pcdata}$ are only an intermediate representation since we will work with a compressed image of these three arrays (see below).

Finally, it is possible to build the tree T without the text-skip nodes (the nodes with label =). However, if we omit these nodes Pcdata will appear in $S_\alpha$ intermixed with the labels of internal nodes. Separating the tree structure (i.e. $<\hat{S}_{last}, \hat{S}_\alpha>$) from the textual content of the document (i.e. $\hat{S}_{pcdata}$) has a twofold advantage: (i) the two strings $\hat{S}_\alpha$ and $\hat{S}_{pcdata}$ are strongly homogeneous hence highly compressible, (ii) search and navigation operations over Tare greatly simplified.

2. Why XBW(d) Compresses Well

Suppose the XML fragment of FIG. 11 is a part of a large bibliographic database for which we have computed the XBW transform. Consider the string=<author. The properties of the XBW transform ensure that the labels of the nodes whose upward path is prefixed by=<author are consecutive in $S_\alpha$.

In other words, there is a substring of $S_\alpha$ consisting of all the data (immediately) enclosed in an <author> tag. Similarly, another section of $S_\alpha$ contains the labels of all nodes whose upward path is prefixed by, say, =@id<book and will therefore likely consists of id numbers. This means that $S_\alpha$, and therefore $\hat{S}_\alpha$ and $\hat{S}_{pcdata}$, will likely have a strong local homogeneity property.

Most XML-conscious compressors are designed to "compress together" the data enclosed in the same tag since such data usually have similar statistics. The above discussion shows that the XBW transform provides a simple mechanism to take advantage of this kind of regularity.

In addition, XML compressors (e.g. XMILL, SCMPPM, XMLPPM) usually look at only the immediately enclosing tag since it would be too space consuming to maintain separate statistics for each possible group of enclosing tags. Using the XBW transform we can overcome this difficulty since the different groups of enclosing tags are considered sequentially rather than simultaneously. For example, for a bibliographic database, Sα would contain first the labels of nodes with upward path=<author<article, then the labels with upward path=<author<book, and finally the labels with upward path=<author<manuscript, and so on. Hence, we can either compress all the author names together, or we can decide to compress the three groups of author names separately, or adopt any other optimization scheme.

3. Navigation and Search Using XBW(d)

Every node of T corresponds to an entry in the sorted multiset S (see FIG. 12). We (logically) assign to each tree node a positive integer equal to its rank in S. This number helps in navigation and search because of the following two properties of the sorted multiset S.

1. Let $u_1, \ldots, u_c$ be the children of a node u. The triplets $s[u_1], \ldots, s[u_c]$ lie contiguously in S in this order. The last triplet $s[u_c]$ has its last-component set to 1; the other triplets have their last-component set to 0.

2. Let $v_1, v_2$ denote two nodes with the same label (i.e., $S_\alpha[v_1]=S_\alpha[v_2]$). If $s[v_1]$ precedes $s[v_2]$ in S, then the children of $v_1$ precede the children of $v_2$ in S.

FIG. 12 illustrates two nodes labeled <book, whose upward path is <biblio. These nodes have rank 4 and 5, and have a total of 6 children that are stored in the subarray S[6, 11]. The children of S[4] are S[6, 8], and the children of S[5] are S[9, 11]. Note that $S_{last}[8]=S_{last}[11]=1$ since these are the last children of their parent.

For every internal node label β, we define F(β) as the rank of the first row of S such that $S_\pi$ is prefixed by β. Thus, for the example of FIG. 12 we have F(<author)=2, F(<biblio)=4, F(<book)=6, and so on. Suppose that the tree contains m internal nodes with label β. We can rephrase Properties 1-2 above stating that starting from position F(β) there are m groups of siblings which are the offsprings of the nodes with label β. The end of each group is marked by a value 1 in the array $S_{last}$, and the k-th group of siblings gives the children of the node corresponding to the k-th occurrence of the label β in $S_\alpha$.

To efficiently navigate and search T, in addition to XBW(d) and the array F, we need auxiliary data structures for the rank and select operations over the arrays $\hat{S}_{last}$ and $\hat{S}_\alpha$. Recall that given an array A[1, n] and a symbol c, $rank_c(A, i)$ denotes the number of times the symbol c appears in A[1, i], and $select_c$(A, k) denotes the position in A of the k-th occurrence of the symbol c.

The pseudocode of the procedure for computing the rank of the children of the node with rank i is shown in FIG. 13 to highlight its simplicity. We first compute the label c of node i by setting $c=\hat{S}_\alpha[i]$ (Step 1). Then, we set $k=rank_c(\hat{S}_\alpha, i)$ (Step 2) and we have that S[i] is the k-th node with label c is $\hat{S}_\alpha$. Because of properties 1-2 the children of S[i] are the k-th group of siblings starting from position y=F(c). The rank of the children is therefore easily computed by way of rank/select operations over the array $\hat{S}_{last}$ (Steps 4-6). For example, in FIG. 2 for i=5 we have c=<book and k=2 so we are interested in the second group of siblings starting from F(<book)=6.

The procedures for navigation and SubPathSearch have a similar simple structure and are straightforward adaptations of similar procedures introduced above. The only nontrivial operations are the rank and select queries mentioned above. Note that navigation operations require a constant number of rank/select queries, and the SubPathSearch procedure requires a number of rank/select queries proportional to the length of the searched path.

B. Computation of the XBW transform

To build the tree T we parse the input document d using an XML parser. For example, in one embodiment, the Expat library by James Clark may be used. Handlers are set to build the tree T from one hundred MBs of XML data is a few seconds. As described above, given T one can compute XBW (d) in time linear in the number of tree nodes.

1. Compression of XBW(d): the XBzip Tool

FIG. 13 illustrates a method for computing the range (First, Last) such that S[First], S[First+1], . . . , S[Last] are the children of node S[i].

FIG. 14 illustrates Pseudocode of the exemplary embodiment XBzip.

For a compressed (non-searchable) representation of the XML document d, one simply needs to store the arrays $\hat{S}_{last}$, $\hat{S}_\alpha$, and $\hat{S}_{pcdata}$ as compactly as possible. This is done in one embodiment by the XBzip tool whose pseudocode is given in FIG. 14. Instead of compressing $\hat{S}_{last}$ and $\hat{S}_\alpha$ separately it is more convenient to merge them in a unique array $\hat{S}'_\alpha$ obtained from $\hat{S}_\alpha$ adding a label </ in correspondence of bits equal to 1 in $\hat{S}_{last}$. For example, merging the arrays $\hat{S}_{last}$ and $\hat{S}'_\alpha$ of FIG. 12 yields $\hat{S}'_\alpha$=<biblio></=</=</<book<book</@id<author<title</@id<author<title</=</=</=</

This strategy usually offers superior performance in compression because it is able to capture repetitiveness in the tree structure.

As we observed above, the arrays $\hat{S}'_\alpha$ and $\hat{S}_{pcdata}$ are locally homogeneous since the data descending from a certain tree path is grouped together. Hence, we expect that $\hat{S}'_\alpha$ and $\hat{S}_{pcdata}$ are best compressed splitting them in chucks according to the structure of the tree T.

FIG. 15 illustrates Pseudocode of XBzipIndex according to an embodiment of the present invention.

2. Supporting Navigation and Search: the XBzipIndex Tool

Navigation and search operations, in addition to XBW(d), require data structures that support rank and select operations over $\hat{S}_{last}$ and $\hat{S}_\alpha$. Rank/select data structures may be applied with theoretically efficient (often optimal) worst-case asymptotic performance. In another embodiment, practical methods can be applied. In particular, XBzipIndex and its pseudocode as shown in FIG. 15.

For the array $\hat{S}_{last}$—search and navigation procedures only require $\text{rank}_1$ and $\text{select}_1$ operations over $\hat{S}_{last}$. Thus, a simple one-level bucketing storage scheme may be employed. In an embodiment, a constant L (default is L=1000), and $\hat{S}_{last}$ is partitioned into variable-length blocks containing L bits set to 1. For each block the following is stored:

The number of 1 preceding this block in $\hat{S}_{last}$ (called 1-blocked rank).

A compressed image of the block obtained by Gzip.

A pointer to the compressed block and its 1-blocked rank.

$\text{Rank}_1$ and $\text{select}_1$ operations over $\hat{S}_{last}$ can be implemented by decompressing and scanning a single block, plus a binary search over the table of 1-blocked ranks.

The array $\hat{S}_\alpha$ contains the labels of internal nodes of T. In this embodiment, it is represented using again a one-level bucketing storage scheme: $\hat{S}_\alpha$ is partitioned into fixed-length blocks (default is 8 Kb) and for each block the following is stored:

A compressed image of the block (obtained using Gzip). Note that single blocks are usually highly compressible because of the local homogeneity of $\hat{S}_\alpha$.

A table containing for each internal-node label β the number of its occurrences in the preceding prefix of $\hat{S}_\alpha$ (called β-blocked ranks).

A pointer to the compressed block and its β-blocked rank.

Since the number of distinct internal-node labels is usually small with respect to the document size, β-blocked ranks can be stored without adopting any sophisticated solution. The implementation of $\text{rank}_\beta(\hat{S}_\alpha, i)$/$\text{select}_\beta(\hat{S}_\alpha, i)$ derives easily from the stored information.

The array $\hat{S}_{pcdata}$ is usually the largest component of XBW (d). $\hat{S}_{pcdata}$ consists of the Pcdata items of d, ordered according their upward paths. The procedures for navigating and searching T do not require rank/select operations over $\hat{S}_{pcdata}$. Thus, a representation of $\hat{S}_{pcdata}$ may be used that efficiently supports XPath queries of the form //_[contains(.,γ)], where π is a fully-specified path and γ is an arbitrary string of characters. To this end a bucketing scheme where buckets are induced by the upward paths may be used. Formally, let $S_\pi[i, j]$ be a maximal interval of equal strings in $S_\pi$. We form one bucket of $\hat{S}_{pcdata}$ by concatenating the strings in $\hat{S}_{pcdata}[i, j]$. In other words, two elements of $\hat{S}_{pcdata}$ are in the same bucket if and only if the have the same upward path. Every block will likely be highly compressible since it will be formed by homogeneous strings having the same "context". For each bucket the following information is stored:

In an embodiment of the present invention, we store an FM-index of the bucket. However, any compressed full-text index could be used. The FM-index is a compressed representation of a string that supports efficient substring searches within the bucket. Substring searches are efficient since they only access a small portion of the compressed bucket (proportional to the length of the searched string, and not to the length of the bucket itself).

A counter of the number of Pcdata items preceding the current bucket in $\hat{S}_{pcdata}$.

A pointer to the FM-indexed block and its counter.

Using this representation of $\hat{S}_{pcdata}$, allows an answer to the query //_[contains(.,γ)] as follows (see procedure ContentSearch in FIG. 16). By the procedure SubPathSearch the nodes whose upward path is prefixed by $\pi^R$ (i.e. the reversal of π) can be identified. Then, the substring $\hat{S}_{pcdata}$ [F, L] is identified, containing the labels of the leaves whose upward path is prefixed by $\pi^R$. Note that $\hat{S}_{pcdata}$ [F, L] consists of an integral number of buckets, say b. To answer the query, requires then searching for γ in these b buckets using their FM-indexes, taking time proportional to |γ| for each bucket. Since the procedure SubPathSearch takes time proportional to |π|, the overall cost of the query is proportional to |π|+b|γ|.

In addition to the above data structures, this also requires two auxiliary tables: the first one maps node labels to their lexicographic ranks, and the second associates to each label β the value F[β]. Due to the small number of distinct internal node labels in real XML files, these tables do not need any special storage method.

FIG. 16 illustrates a method of searching for the string γ as a substring of the textual content of the nodes whose leading path is (possibly anchored to an internal node).

Example embodiments of the present invention have now been described in accordance with the above advantages. It will be appreciated that these examples are merely illustrative of the invention. Many variations and modifications will be apparent to those skilled in the art.

What is claimed is:

1. A method of treating data within a labeled tree structure, the method comprising:
   inputting data in a labeled tree structure;
   transforming the data into two coordinated arrays; and
   using the transformed data to one selected from a group consisting of compressed storage, compressed transmission, and compressed indexing,
   wherein said labeled tree structure comprises:
     a plurality of nodes and edges that define a parent-child relationship, comprising rightmost child nodes, and node labels at said nodes,
   wherein said step of transforming the data into two coordinated arrays comprises:

creating a first array that is a list of binary digits comprised of a first binary value and a second binary value, and
creating a second array that is a list of said node labels,
wherein said first and second binary values of said first array are coordinated to node labels of said second array to form respective couples, in such a way that, for each of said couples, a binary value of said first array is coupled to a node label of said second array that occupies a same position; and
wherein, for each of said couples, labels of said second array of said rightmost child nodes of said labeled tree structure are coupled to said first binary value, and all the other nodes of said second array are coupled to said second binary value.

2. The method of claim 1, wherein said step of transforming the data into two coordinated arrays further includes:
creating a third array comprised of strings of node labels induced by upward tree-paths,
wherein an upward tree path of said third array is coordinated to a couple of said coordinated first and second arrays in such a way that said upward tree-path leads to the node label of said couple.

3. The method of claim 1, wherein said predetermined child nodes are rightmost child nodes of said labeled tree structure.

4. The method of claim 2, wherein said couples are sorted according to a stable sorting of said strings of node labels induced by upward tree-paths.

5. The method of claim 1, wherein the data is in a data format that can be modeled as a labeled tree.

6. The method of claim 5, wherein the data is eXtensible Markup Language XML data.

7. The method of claim 6, wherein the method is capable of being applied to storage, indexing or transmission of compressed eXtensible Markup Language XML data.

8. The method of claim 6, further comprising:
computing $XBW(d)=<\hat{S}_{last}, \hat{S}_\alpha, \hat{S}_{pcdata}>$ for the XML data;
merging $\hat{S}_\alpha$ and $\hat{S}_{last}$ into $\hat{S}'_\alpha$; and
compressing separately $\hat{S}'_\alpha$ and $\hat{S}_{pcdata}$
wherein:
$\hat{S}_{last}$ is said first array,
$\hat{S}_\alpha$ is said second array, and
$\hat{S}_{pcdata}$ is an array containing strings of node labels induced by upward tree-paths of leaf-nodes of the labeled tree structure.

9. The method of claim 8, further comprising:
storing $\hat{S}_{last}$ using a compressed representation supporting rank/select queries;
storing $\hat{S}_\alpha$ using a compressed representation supporting rank/select queries;
splitting $\hat{S}_{pcdata}$ into buckets formed in such a way that tree leaves having a same upward labeled path in said labeled tree have their leaf-labels posed in a same bucket; and
compressing each bucket using any data structure supporting full-text queries.

10. The method of claim 9, further comprising: storing $\hat{S}_{pcdata}$ using a compressed data-structure supporting substring searches in a subarray of $\hat{S}_{pcdata}$ specified at a query time.

11. The method of claim 1, further comprising:
reconstructing the transformed data from the two coordinated arrays.

12. The method of claim 8, further comprising:
reconstructing the compressed and indexed data, wherein reconstructing includes:
building an array F according to a function of a labeled tree T based on counting node labels.

13. The method of claim 12, wherein reconstructing further comprises:
building an array J according to a function of the labeled tree T, wherein array J is defined in such a way to allow any node of array J to refer to a position in the two coordinated array where a block of information referring to the children occurs.

14. The method of claim 13, wherein reconstructing further comprises:
recovering the transformed data using the array J.

15. The method of claim 1, further comprising:
performing at least one navigational query on the compressed indexed data.

16. The method of claim 15, wherein at least one navigational query includes at least one from the group consisting of querying the parent of u, querying the ith child of u, and querying the ith child of u with label c, wherein u is a node of the labeled tree, i is an integer, and c is a node label.

17. The method of claim 16, wherein performing a navigational query includes performing GetChildren, where GetChildren is a method for computing a range for an index GCindex such that S[First], S[First+1], . . . S[Last] are the children of node S[GCindex] and S is a sorted multiset.

18. The method of claim 17, wherein performing at least one navigational query includes performing GetParent, where GetParent is a method for computing an index GPoutputindex for an input index GPinputindex such that S[GPoutputindex] is the parent of S[GPinputindex] and S is a sorted multiset.

19. The method of claim 1, further comprising:
supporting queries that, received in input a node u and a label c, count and return how many children of u in the said labeled tree have label c.

20. The method of claim 1, further comprising searching compressed or indexed data,
wherein searching the compressed or indexed data includes decompressing only a small fraction of the data; and at least one from a group consisting of outputting the results of the search or counting the number of search results.

21. The method of claim 20, wherein searching further comprises path searching, the path searching comprising:
inputting a given sequence of node labels;
searching for the occurrence of that label sequence as a contiguous subpath in the said compressed and indexed labeled tree; and
outputting the position or the number of occurrences of said input subpath in the said compressed and indexed labeled tree.

22. The method of claim 20, wherein searching further comprises term searching, the term searching comprising:
inputting a given sequence of node labels and a term;
searching for the occurrence of that term among the labels of the tree leaves in the said compressed and indexed labeled tree, that immediately descend from occurrences of the input subpath; and
using the position or the number of occurrences of said input term.

23. A method for transforming a labeled tree structure into arrays, wherein said labeled tree structure comprises:
a plurality of nodes and edges that define a parent-child relationship, comprising rightmost child nodes, and
node labels at said nodes,
wherein said step of transforming transforms data into two coordinated arrays, by steps including:

creating a first array that is a list of binary digits comprised of a first binary value and a second binary value, and creating a second array that is a list of said node labels, wherein said first and second binary values of said first array are coordinated to node labels of said second array to form respective couples, in such a way that, for each of said couples, a binary value of said first array is coupled to a node label of said second array that occupies a same position; and wherein, for each of said couples, labels of said second array of said rightmost child nodes of said labeled tree structure are coupled to said first binary value, and all the other nodes of said second array are coupled to said second binary value.

24. The method of claim 22, wherein said step of transforming the data into two coordinated arrays further includes:

creating a third array comprised of strings of node labels induced by upward tree-paths, wherein an upward tree path of said third array is coordinated to a couple of said coordinated first and second arrays in such a way that said upward tree-path leads to the node label of said couple.

25. The method of claim 23, wherein said couples are sorted according to a stable sorting of said strings of node labels induced by upward tree-paths.

* * * * *

UNITED STATES PATENT AND TRADEMARK OFFICE
CERTIFICATE OF CORRECTION

PATENT NO. : 8,156,156 B2
APPLICATION NO. : 11/783288
DATED : April 10, 2012
INVENTOR(S) : Paolo Ferragina et al.

It is certified that error appears in the above-identified patent and that said Letters Patent is hereby corrected as shown below:

Title page, item [75], the first name of co-inventor LUCCIO should read, "FABRIZIO" instead of "FABRIZION"

Signed and Sealed this
Fourth Day of September, 2012

David J. Kappos
*Director of the United States Patent and Trademark Office*